Dec. 20, 1932.  C. W. NEILL  1,891,602
SECTIONAL CRUISER
Filed July 21, 1930   4 Sheets-Sheet 1

Inventor

Charles W Neill.

Dec. 20, 1932.    C. W. NEILL    1,891,602
SECTIONAL CRUISER
Filed July 21, 1930    4 Sheets-Sheet 2

Inventor
Charles W. Neill

Dec. 20, 1932.  C. W. NEILL  1,891,602
SECTIONAL CRUISER
Filed July 21, 1930  4 Sheets-Sheet 3

Inventor
Charles W. Neill

Dec. 20, 1932.  C. W. NEILL  1,891,602
SECTIONAL CRUISER
Filed July 21, 1930  4 Sheets-Sheet 4

Inventor
Charles W. Neill

Patented Dec. 20, 1932

1,891,602

UNITED STATES PATENT OFFICE

CHARLES W. NEILL, OF SYRACUSE, NEW YORK

SECTIONAL CRUISER

Application filed July 21, 1930. Serial No. 469,291.

This invention relates to sectional boats.

It has long been a practice in the manufacture of small boats, such as row boats, to build these boats in sections to facilitate shipment from one place to another as, for example, in automobiles for fishing trips or the like. In such cases the sections are assembled on the edge of the water to make a complete boat ready for use. The assembled boat is a given size however, it being necessary to assemble all of the sections to make up a complete boat.

It is an object of this invention to provide a sectional boat which has all of the advantages of the ordinary sectional boat in that it may be completely disassembled for shipment. A further object is to provide a sectional boat so designed that complete boats of various sizes may be made up by using some or all of the sections of other sized boats.

A further object of the invention is to provide a sectional boat of the cruiser type, that is, a sectional boat that is adapted to boats larger than row boats and may be used for cruisers of the double-ender or transom stern type, or any other desired type of hull form.

A further object of the invention is to provide a novel construction for sectional boats of the cruiser type such that a complete boat may be assembled by the purchaser with ordinary hand tools and without the necessity of experience as a boat builder. The construction is further designed and so fastened that changes and disassembling of any part or all of the boat may be easily accomplished.

Other objects and advantages will appear and will be pointed out in connection with the description of the drawings in which like reference characters denote corresponding parts in all the views.

Fig. 1 A is a diagrammatic plan view showing the hull form of the fourteen section cruiser shown in Fig. 1.

Fig. 2 A is a diagrammatic plan view showing the hull form of the sixteen section cruiser shown in Fig. 2.

Fig. 3 A is a diagrammatic plan view showing the hull form of the six section boat shown in Fig. 3.

Fig. 3 B is a diagrammatic plan view showing the hull form of the six section cruiser shown in Fig. 3, but with the two mid-ship sections replaced by others to give the hull a fairer form.

Fig. 4 A is a diagrammatic plan view showing the hull form of the eight section boat shown in Fig. 4.

Fig. 4 B is a diagrammatic plan view showing the hull form of the eight section boat shown in Fig. 4, but with the two mid-ship sections replaced by others to give the hull a fairer form.

Fig. 5 A is a diagrammatic plan view showing the hull form of the ten section cruiser shown in Fig. 5.

Fig. 6 is a cross section through the hull of one of the cruisers, the section being taken a short distance ahead of the mid-ship station.

Fig. 7 is a section through the plates of the hull showing improved fastening means.

Fig. 8 shows a modification of the fastening means illustrated in Fig. 7, for use in attaching a rub rail, or similar member.

Fig. 12 A is a diagrammatic plan view of the hull form of the sixteen section cruiser shown in Fig. 12.

*General design of hull*

Figure 1:
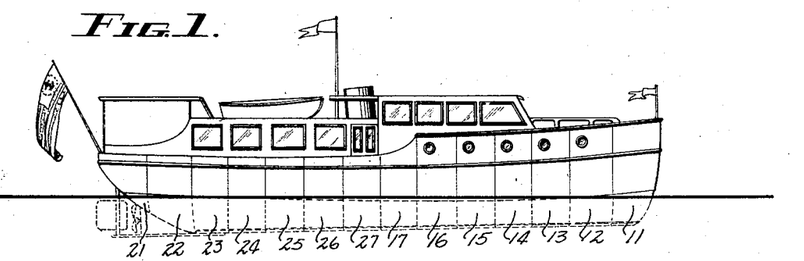
Fig. 1 is a side elevation, mostly diagrammatic, of a sectional boat embodying my invention, and made up of fourteen sections.
Figure 1A:
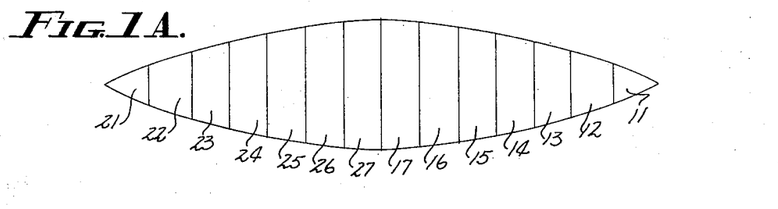

The hull of the cruiser shown in Fig. 1 is made up of fourteen sections, the first seven sections from the bow being indicated respectively as 11, 12, 13, 14, 15, 16, and 17. The other sections, (i. e. seven sections from the stern) are indicated from the stern forward by the reference characters 21, 22, 23, 24, 25, 26, and 27. The plan view of these sections is shown in Fig. 1 A.

If it is desired to make the cruiser shown in Fig. 1 larger the amid-ship sections 17 and 27 are detached, in a manner to be described hereinafter, and two new sections 18 and 28 added to the hull (see Figs. 2 and 2 A).

Figure 2:
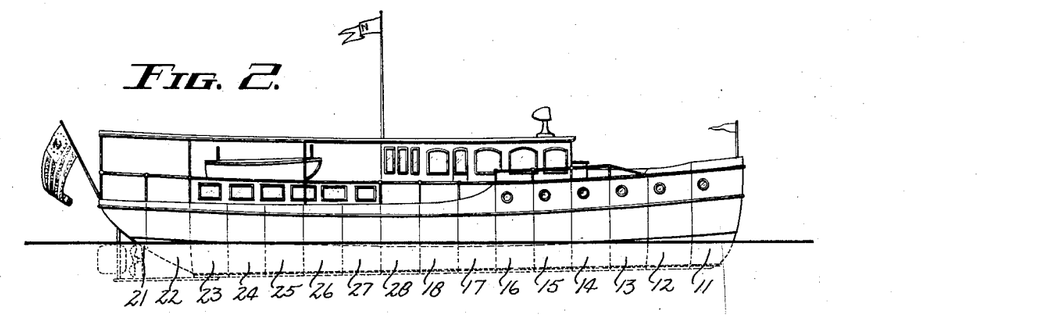
Fig. 2 is a side elevation, mostly diagrammatic, of a sectional boat made of sixteen sections, the hull being the same as the hull shown in Fig. 1 with the addition of two mid-ship sections; this sixteen section boat being the largest shown in the preferred embodiment of the invention.
Figure 2A:
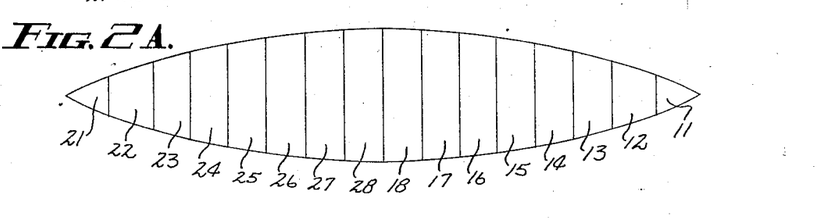

The hull shown in Figs. 2 and 2 A presents a continuous fair form from stem to stern. This hull might be further enlarged by disconnecting section 18 from section 28 and inserting additional sections which might have sides running straight (i. e. parallel to the keel line) or might be curved to form a broken curve with the hull lines of Fig. 2 A. I prefer, however, to make the cruiser shown in Figs. 2 and 2 A the largest size and the goal for the owners of smaller sectional boats to build to.

Figure 3:
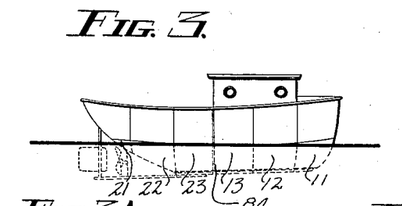
Fig. 3 is a side elevation, largely diagrammatic, of a six section boat having a hull made up of the three bow and three stern sections of the cruiser shown in Fig. 1 joined amid-ships by a short filler section.

If the bow sections 11, 12, and 13, and the stern sections 21, 22, and 23 of the cruiser shown in Figs. 1 and 1 A are joined together, a small boat is obtained as shown in Figs. 3 and 3 A. The hull form presents a broken curve and due to the angle at which the hull plates of sections 13 and 23 come together a short filler section or connecting section 84 is used as will be hereinafter explained. The break in the hull form is not sufficient to be objectional from a point of view of operation of the boat, but may be objectionable to some people from the point of view of appearance. In such a case sections 13a and 23a, designed to give the boat a hull form presenting a continuous fair curve, may be substituted for the sections 13 and 23. These sections 13a and 23a are of course, of no use when the boat is enlarged.

Figures 3A, 3B, 4A, 4B:
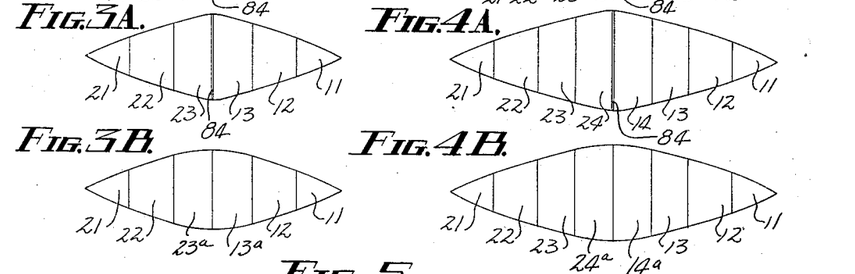
Figure 4:
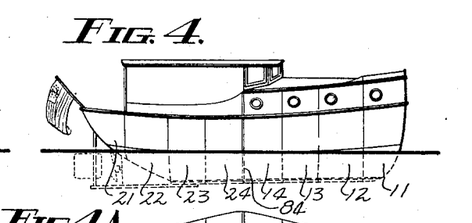
Fig. 4 is a side elevation, mostly diagrammatic, of an eight section boat having a hull made up of the four forward and four after sections of the cruiser shown in Fig. 1 joined amid-ships by a short filler section.

An owner starting with the boat shown in Figs. 3 and 3 A may when he desires a larger boat, buy two new sections 14 and 24 and insert them in the hull between the sections 13 and 23. The upper work or deck may be changed if desired, in a manner to be hereinafter described, and a cruiser such as shown in Figs. 4 and 4A obtained. A new filler section or connecting section 84 is necessary with the larger hull. For owners who object to the break in the curve of the hull form sections 14a and 24a may be substituted for sections 14 and 24 respectively, though as is the case with the other substitute sections these sections 14a and 24a are of no further use when the hull is next enlarged.

Figure 5:
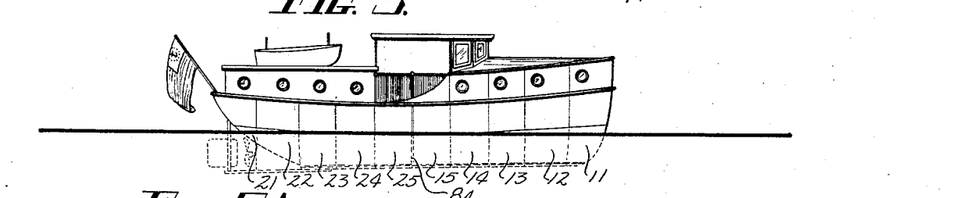
Fig. 5 is a side elevation, mostly diagrammatic, of a ten section cruiser having a hull made up of the five forward and five after sections of the cruiser shown in Fig. 1 joined amid-ship by a short filler section.

The cruiser shown in Figs. 4 and 4 A may be enlarged by inserting new sections 15 and 25 into the hull to form a cruiser such as shown in Figs. 5 and 5 A. A new filler section or connecting section 84 is necessary, but all other parts of the smaller hull are used. With a boat as large as that shown in Fig. 5 the break in the curve of the hull form is so slight that it is hardly noticeable; therefore no substitute sections are shown for the sections 15 and 25. With the larger boat the sections becomes more costly, due to the greater beam, and the expense of substitute sections to round out the hull form, and which cannot be used if the hull is later enlarged further, is unwarranted.

The cruiser shown in Figs. 5 and 5 A may be enlarged by inserting sections 16 and 26 between sections 15 and 25. No such boat is shown in the drawings since the boats shown appear to adequately illustrate the principle. Still further enlargement of the hull is effected by inserting sections 17 and 27 which produces the hull shown in Figs. 1 and 1 A. Further lengthening of the hull can be accomplished as already explained.

It will be noted that the cabin or upper work is different in each of the Figs. 1 to 5, it being understood that the owner of the boat may change the upper work or deck structure at the same time that he changes the size of the hull. It may be desirable to lay out the cabins and upper work so that all partitions and ends of cabins come at the end of section, so as to cause no inconvenience when the hull is divided, and for other reasons which will be brought out in connection with the description of the structural features of the boats.

*Structural details of hull (bow and midship)*

Figures 5A, 6, 7, 8:
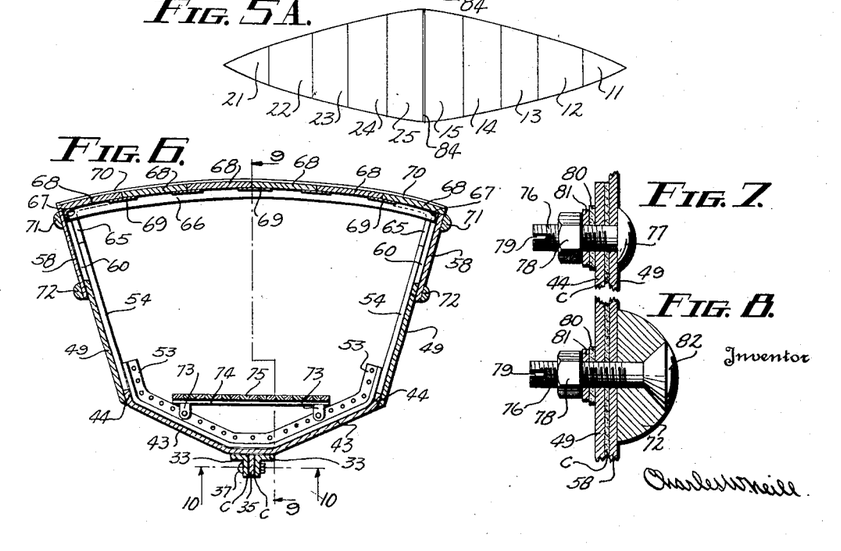
Figures 9, 10, 11:
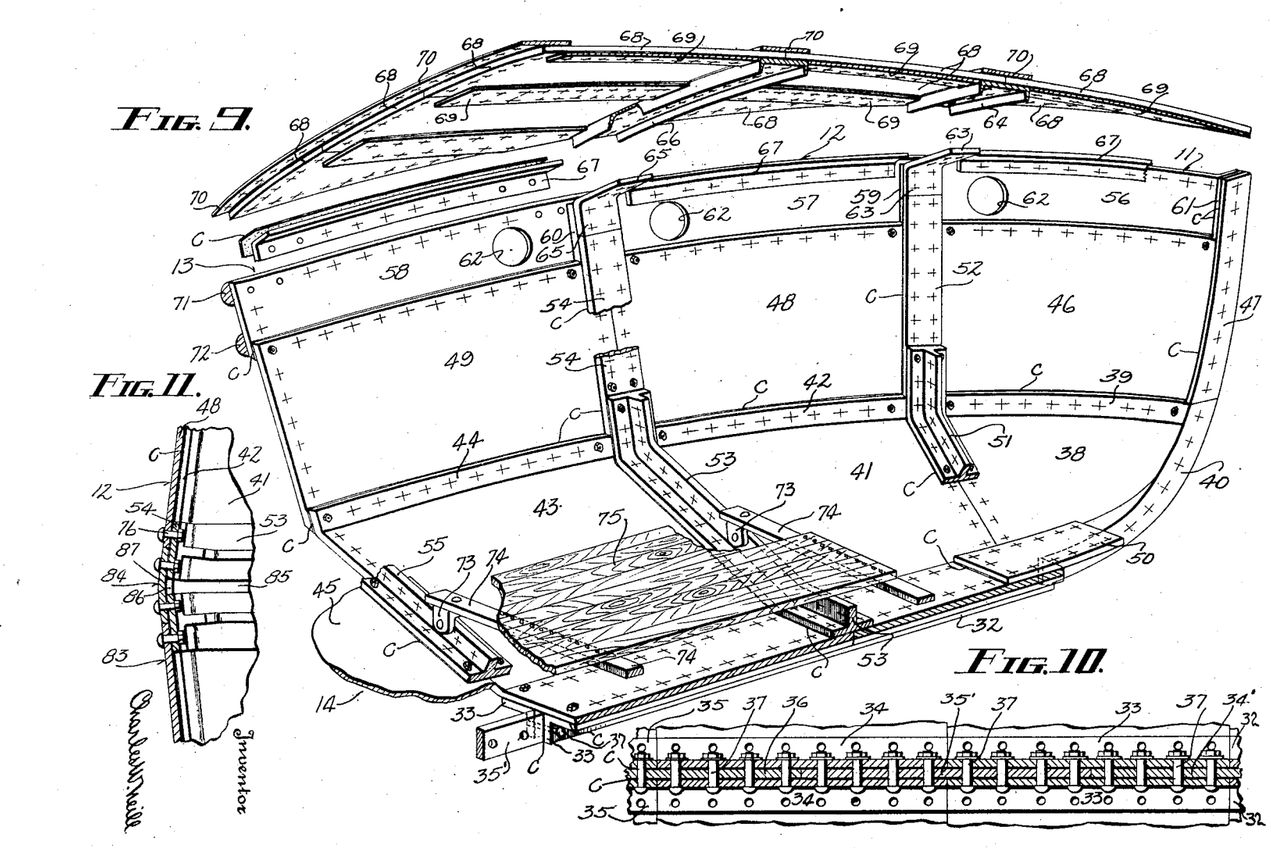
Fig. 9 is an exploded perspective view partly in section and partly broken away, showing the construction of the keel and port side of the first three bow sections, viewed from the inside; the deck over these sections being also shown.
Fig. 10 is a section through the keel taken on the plane of the fastening means, the view being from the bottom looking up.
Fig. 11 is a section, viewed from the top, showing the manner of attaching intermediate sections by means of a short filler section.

Structural details of the boat which is illustrated as the preferred embodiment of my invention are shown in Figs. 6, 9, and 10. The keel proper begins at the forward end of the second section 12 and is formed of two keel angles 32 clamping a keel butt member between them as will be explained later in connection with certain other keel angles.

The keel angles 32 extend under the second section only. Similar keel angles 33 extend under section 13. In like manner the next section 14 will be supported on keel angles 34, and the section following will be supported on keel angles 35, etc. Fig. 10 is a fragmentary view partly in section of the keel construction viewed from the bottom, the section being taken along the line of the fastening means through the vertical legs of the keel angles. Each keel angle runs the entire length of its corresponding hull section and the bottom of the hull section is attached to the horizontal part of the keel angle.

When fastened in place the keel angles have their vertical portions spaced apart sufficiently to accommodate the keel butt members 34', 35', and 36 therebetween. When the boat is assembled the keel angles of each section are brought butt against each other at their ends and a keel butt member inserted along and between the keel angles. It will be noted from Fig. 10 that the keel butt members 34', 35', and 36 terminate midway between the ends of the keel angles. Keel fastenings 37 are used to rigidly secure the keel angles to the keel butt members and thus form a composite beam for the keel of the assembled boat. The keel butt members are illustrated as being of substantially the same thickness as the keel angles, but this is a question of design and they may be made any thickness desired.

The bottom of the boat in the bow section 11 is made up of two curved plates 38, one of which is shown in Fig. 9, these plates 38 have a bent up flange 39 at the chine and flange 40 at the stem.

The bottom of the stern section on a double ender type boat may be of similar construction to the bow with the necessary modifications as to shape to allow for the propeller and rudder.

The bottom of section 12 is made up of a plate 41 extending from the chine on one side of the boat to the chine on the other side and having bent up flanges 42 at the chine and a flat portion over the keel for attachment to the keel angles.

The bottom of section 13 is similar to that of section 12 and is made of a plate 43 having its upturned flanges 44 at the chine (see Figs. 6 and 9). The bottom of all other sections is similar; a part of the plate making up the bottom of section 14 is indicated in Fig. 9 at 45.

The sides of the boat are made up by bolting side plates to the upturned chine flanges of the bottom plates. Referring to the bow section in Fig. 9, a side plate 46 is bolted to the flange 39, the connection being of the lap joint type with caulking C between the plates. The plate 46 is flanged at the stem so as to lie flat against a stem plate 47. Caulking is provided between these plates as in the case of all other joints in the hull.

A plate 48 forms the side of section 12 and is attached to the chine flange 42 of the bottom plate 41 with caulking C in the seam. A plate 49 forms the side of section 13.

The bow section 11 is connected to the section 12 by butt type connections. The edges of the plates 38 and 41 butt against each other. A butt plate 50 with caulking C between it and the other plates connects the lower part of sections 11 and 12. From this butt plate 50 a rib member 51, preferably a T-shape casting, extends to the side of the boat and slightly above the chine. This rib member 51 serves as a butt plate to connect plates 38 and 41.

An extension rib 52 attached to the rib casting 51 provides the butt plate for the connection between the plates 46 and 48.

The connection between the bottom plates of the other sections, as the second and third sections (sections 12 and 13) is also of the butt type, a rib member 53 serving as the butt plate. A rib extension 54 provides the butt plate to connect the side plates 48 and 49. Other sections are connected by butt joints of the same type. A part of the rib member 55 between sections 13 and 14 is shown in Fig. 9.

The stern sections may be built similar to the bow sections with the necessary modifications in the keel for the rudder and propeller which are of the conventional type. These keel modifications will be explained in detail in connection with the description of the transom stern.

On the larger size boats the sides of the hull are raised by the addition of the upper side plates 56, 57, and 58. The connection of these plates with the lower side plates is of the lap type and their connection with each other is of the butt type; plates 59 and 60 form the butt plates connecting the upper side plates.

At the stem a spacer member 61, of the same thickness as the side plate 46, fills the space between the upper side plate 56 and the stem plate 47.

Windows or port holes 62 may be provided in the side plates. These port holes are preferably located equidistant from the upper and lower edges of the upper side plates, but not equidistant from the forward and after edges of the side plate. This arrangement permits port holes to be equally spaced if desired, or one plate, as plate 58, may be turned around on a vertical axis and mounted on the hull so that the port hole will be further forward if the cabin partitions make the normal spacing undesirable.

A deck angle 63 attached to the butt plate 59 supports a deck beam 64. At the second station a corresponding deck angle 65 supports a deck beam 66. Further support for the deck is provided between stations by the angle molding 67 which is backed by caulking to provide a watertight connection between the side plates and the deck.

The deck is made up of deck plates 68 which are the length of one section. Lower deck plates 69 form butt plates for connecting the deck plates 68. The deck beams 64 and 66 serve as butt plates for connecting the ends of the deck plates 68. Caulking is provided for all the butt joints in the deck to make the same watertight, and to prevent squeaks and rattles if any of the plates become loose. The deck may be covered with canvas in the conventional manner if the deck plates 68 are attached to the lower deck plates 69 and to the deck beams 66 with flat head countersunk bolts. Transverse deck strips 70 may be used as shown in Fig. 9 if desired.

Building the deck in the manner described makes it possible to use a large number of deck plates of the same size, a great commercial advantage. Also a hatch may be located in the deck at any time and later changed to a different location by simply interchanging the position of deck plates.

The boats shown in the drawings are provided with upper and lower rub rails 71 and 72. The lap joint between the side plates need not be covered with a rub rail unless desirable, and on a hull having freeboard more than two side plates high a rub rail would not be provided over the lower joint.

A row of holes is provided in the upper section of the rib members. Floor angles 73 may be secured to the rib members by bolts passing through any of these holes. Floor beams 74 are secured to the floor angles by suitable means. The location of the floor angles on the rib members will determine the height of the floor beams above the keel, as will be obvious from Fig. 6. The floor may be made up of longitudinal members 75.

Bolt fastenings (Figs. 7 and 8)

Where plates are fastened together permanently rivets may be used in the conventional manner. Bolt fastening means seem preferable and a form of bolt which is particularly well adapted for use with the boats is shown in Figs. 7 and 8.

Fig. 7 shows a bolt fastening such as is used for connecting the chine flange 44 with the side plates 49. A bolt 76 is provided with a round head 77 of the same form as a conventional round headed rivet. The bolt is threaded to receive a nut 78. A slot 79 is cut in the thread end of the bolt. A lock washer 81 is provided to keep the connection from becoming loose under vibration, and a fiber washer 80 may be inserted between the lock washer 81 and the flange 44 to provide some resilience, to make the connection more water tight and to protect the flange 44 from being scretched by the lock washer when the nut is first screwed up tight.

Fig. 8 shows a fastening similar to Fig. 7 but slightly longer and with modified head 82 for use in fastening plates and attaching a rub rail.

The fastening means shown in Figs. 7 and 8, and described above in detail give an outboard appearance and form like a round headed rivet and offer very little resistance to the flow of water past the hull. In operation these fastenings are assembled by holding the bolt by hand until the nut 78 is screwed over the end threads and then holding the bolt against turning by inserting a screw driver into the slot 79 while a wrench is used to tighten up the nut 78. Due to this construction whereby the bolts may be tightened up from one side only, it is possible to tighten up a leaky seam from the inside of the boat and not necessary that the boat be taken out of the water due to the fact that the leak is below the water line.

Connecting section

On the small sized cruisers difficulty may be experienced in connecting the midsections together due to the angle between the rib member 54 and the side plates of the next section as shown in Fig. 11. This problem may be solved in a number of ways, but the construction shown in Fig. 11 is preferable.

Fig. 11 shows the connection between section 12 and another section designated generally as 83, the connection being one embodying considerable break in the curve of the hull. Section 83 is of exactly the same cross section as section 12 but due to the angle at which the side plates come together it is obvious that a butt joint such as used to join the sections in Fig. 9 is impossible.

The connection is made by using a very short section made up of a bottom plate 85 having a chine flange 86 and side plate 87 similar to the full size sections. This short connecting section 84 has no rib member or rib extension since it bolts on to the rib members and rib extensions of the two sections which it is used to connect, as shown in Fig. 11.

Section 84 has the same kind of keel angles as found on the full size sections and the keel butt member extending under section 84 is slightly longer than the keel butt members 34', 35' and 36 so as to extend from under the mid point of the section 12 to under the mid point of section 83.

Transom stern type cruiser

Figure 12:
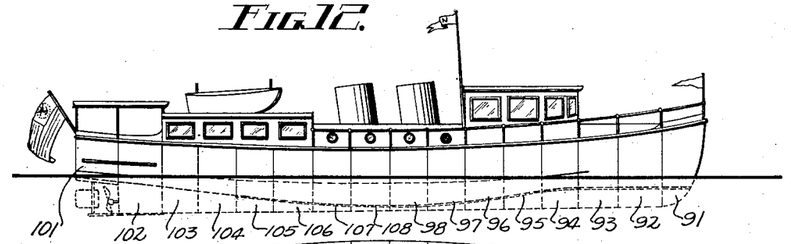
Fig. 12 is a side elevation, mostly diagrammatic, of a sixteen section cruiser, of the transom stern type, embodying my invention.
Figure 12A:
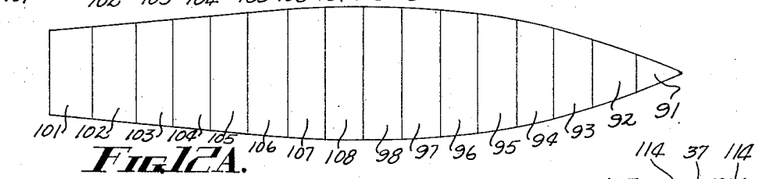

Figs. 12 and 12 A show the invention applied to a cruiser of the transom stern type. The cruiser shown is of sixteen sections and corresponds to the double-ender shown in Figs. 2 and 2 A. Smaller boats may be made from the sections of this cruiser shown in Figs. 12 and 12 A in a manner similar to that described in connection with the double-ender cruisers. The forward sections are indicated 91 to 98, and the after sections 101 to 108. The sections 91 and 92 may be made with conventional contour such as used on V-bottom boats in which the chine does not start at the stem. The modifications of the hull design from that previously described will be apparent to those skilled in the art. Plates may be fastened in the same manner as described in connection with Fig. 9. The one important structural change in Fig. 12 from the other boats shown is the difference in the keel angles which under many of the sections have much longer vertical sections in order to obtain a straight line for the bottom of the keel. This keel construction will be described in more detail later.

Stern keel construction

Figures 13, 14:
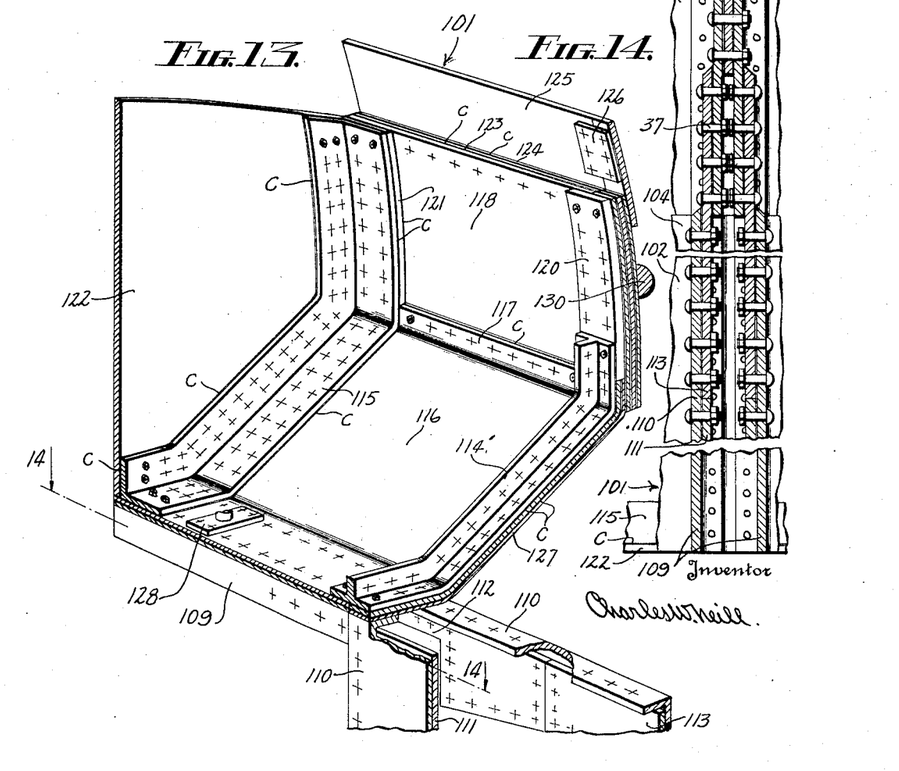
Fig. 13 is a perspective view partly in section, and partly broken away, showing the construction of the stern and keel in the last section of the transom stern type cruiser shown in Fig. 12.
Fig. 14 is a section through the keel under the stern sections of the boat shown in Fig. 12, the section being taken along the line 14—14 looking up.

Fig. 13 shows details of the hull construction of the transom type stern and other modifications which will be more fully described later. The keel construction of Fig. 13 a section of which is shown also in Fig. 14, may be used on the double-ender sterns shown in Figs. 1 to 5 as well as on the transom stern type shown in Figs. 12 and 12 A. The keel construction previously described for use under the bow and mid-ship sections cannot be used to good advantage at the stern with a single screw boat because of the difficulties met with in running the propeller shaft through the keel.

The keel angles 109 under the stern section are similar to the ones previously described in connection with Figs. 9 and 10 except that the angles are turned so that the vertical sections are spaced away from each other as shown in Fig. 14. The keel angles under section 102 are also turned in this manner, but the vertical sections are turned down far enough to form the straight line of the keel shown in Fig. 12, to accommodate the skeg and provide a support for the outboard propeller shaft bearing in the manner conventional to the ordinary wooden keel.

The keel angles 109 and 110 are connected by butt plates 111 and 112 which may run from the mid-point under the last stern section 101 to the mid-point under the next section 102. These butt plates 111 and 112 may be of suitable shape so as to come to the bottom of the keel angles 109 and 110 as shown in the case of the butt plate 112 in Fig. 13.

The keel angles 114 under section 105 are disposed with their vertical sections close together, as previously described in connection with the description of the hull construction of Figs. 9 and 10. The next section 104 has the keel angles turned the other way however, as shown in Fig. 14, and in place of the butt joint between the keel angles when joined to the other sections the double lap joint connection shown in Fig. 14 may be used.

The propeller shaft may come through the bottom of section 104 using a conventional shaft log fitting such as is ordinarily used where the top of the keel is substantially flat. The propeller shaft will pass down between the keel angles in the same manner as it ordinarily passes through the dead wood of a wooden keel.

The keel butt plates 111, 112, and 113 do not extend all the way to the horizontal leg of the keel angles 109 and 110 since if they did so they would interfere with the bolts which fasten the keel angles to the bottom of the boat.

Transom stern construction

The construction of the transom stern is shown in Fig. 13. A rib member 114' at the forward end of this stern section 101 is the same as the rib members previously described.

A transom casting 115 is of angular section and may extend to the gunwales as shown, or be provided with extensions as shown on the rib member 114'.

A bottom plate 116 is formed with a chine flange 117 to which a side plate 118 is connected. This construction together with the rib extension 120 and the caulking between all joints is the same construction as described in connection with the sections shown in Figs. 9 and 10.

A spacer 121 is inserted between the plate 118 and the transom casting 115 as shown. A transom plate 122 is secured to the transom casting by bolts, or other suitable means.

The sides of the section shown in Fig. 13 are made up of three plates 118, 123, and 124, preferably separated by caulking C to prevent the plates from rubbing together or developing rattles when subjected to vibrations from the engine of the cruiser. The sectional cruisers shown in this application are designed primarily to be assembled by the purchaser and the use of a plurality of plates obtains the strength of a heavy thick plate, but with the use of thinner plates which can be more easily bent to fit the rib forms of the sections. The plate 124 is shown thinner than the other plates and may be of copper or other rustless material and applied as a protective sheathing, rather than for strength if desired. A second bottom plate 127 is shown in Fig. 13.

The inside bottom plate may be of thin non-corrosive material to prevent damage to the bottom of the hull from bilge water. The multiple plate construction may be used on all of the sections of the cruisers, such as the sections shown in Fig. 9, the multiple plates being fastened and shaped exactly the same as the single plate construction.

The gunwale may be raised to increase the freeboard by bolting an upper plate 125 to the side plates. The upper plate 125 may be attached to the corresponding plate of the next section forward by a butt plate 126.

A lower rub rail 130 is provided on the section illustrated in Fig. 13, such provision corresponding to conventional practice on boats of the transom stern type.

While I have illustrated the preferred embodiment of my invention and shown certain modifications thereof, various other modifications may be made without departing from the scope of the invention as set forth in the appended claims.

What I claim is—

1. A sectional boat including a bow section; a plurality of intermediate sections; a rib member secured to one of said intermediate sections; a rib member secured to another of said intermediate sections; and a connecting hull section secured at opposite ends to each of said rib members, said connecting hull section being of shorter length than the sections to which it is connected.

2. A sectional boat hull including, a bow section; a stern section; a plurality of intermediate sections; a composite keel of substantially continuous surface including keel members, some of which terminate at the stations at which hull sections terminate, and others of which terminate at points between the terminations of hull sections; and means for securing the keel members together.

3. A sectional boat including a bow section; a stern section; a plurality of intermediate sections; a composite keel including members located entirely under respective intermediate sections, and members located respectively throughout a portion of their length under one intermediate section and extending throughout a portion of their length under another of the intermediate sections, all of said keel members abutting against the ends of adjacent keel members so that the surface of the keel is substantially continuous; and means for securing the keel to the sections above it.

4. A sectional boat including a plurality of sections; means detachably securing said sections together to form a hull; keel members secured to certain of said sections and substantially coextensive in length with their respective sections; other keel members of substantially the same length as the first mentioned keel members; and means to join said other keel members to the first mentioned keel members to provide butt joints connecting the adjacent members to form a single composite keel of substantially continuous surface under the boat.

5. In a sectional boat a bow section; a stern section; a plurality of intermediate sections; an angular keel member under each of said intermediate sections; means securing one leg of the angular keel member to its respective section; and a member mounted on the other leg of each of the angular keel members of two adjoining sections to provide a butt joint; and fastening means securing said butt joint extending substantially one-half the length of each section.

6. In a sectional boat a keel; sections detachably mounted on the keel and detachably joined together, said sections including bottom and side plates, certain of the side plates being formed symmetrical with respect to the adjoining plates of the hull so that such plates may be secured to the adjoining plates with either side on the outside of the hull, said symmetrical plate being also formed with an opening therein the vertical median axis of the opening being spaced away from the vertical median axis of the plate so that the fore and aft position of the opening may be changed by mounting the plate with the other side on the outside.

7. A boat hull including rib members; corrosion resistant plates mounted on said rib members; plates mounted over said corrosion resistant plates for imparting added strength to the hull; and means for fastening all of said plates to the rib members.

8. A boat hull including rib members; corrosion resistant plates mounted on said rib members; plates mounted over said corrosion resistant plates for imparting added strength to the hull; corrosion resistant plates mounted over the intermediate plates to provide a sheathing for the outside of the hull; and means for fastening all of the plates to the rib members.

9. A metal boat including rib members; thin metal plates, which may be bent by hand to the form of the rib members, mounted on the rib members; other similar thin metal plates mounted over said first thin metal plates to provide additional strength and rigidity to the hull; and means for securing all of said metal plates to the rib members.

10. A boat hull including rib members; plates covering the rib members, said plates being laminated on parts of the hull where the position of the rib members requires curvature of the plates, and each of said laminations comprising a sheet of material thin enough to be bent by hand to the desired form, and fastening means securing the plates to the rib members.

11. A sectional boat including in combination a fair form hull comprising sections; means to fasten the respective sections together; deck structure mounted on the hull, said deck structure including sections for mounting on the respective hull sections and formed of substantially flat deck plates of equal size providing substantially the entire surface of the deck; and other deck plates formed to fit the fair form of the hull and located between the gunwale and the edges of the first mentioned deck plates; butt plates connected to the adjacent deck plates; and means to fasten the deck plates to the butt plates and to connect the sections of the deck together.

12. A boat including in combination a fair form hull; a deck over a portion of said hull including a plurality of substantially flat deck plates of the same dimensions, to form the center portion of the surface of said deck; other deck plates along the edge of the deck, said other deck plates being formed to fit the area between the gunwale and the edges of the portion of the deck formed by the first deck plates; and means to secure all of the deck plates in position, including butt plates for connecting the adjacent deck plates together.

13. A boat hull including rib members; corrosion resistant plates mounted on the rib members; a series of thin metal plates, which may be bent by hand, mounted over the corrosion resistant plates to form a laminated hull of requisite strength; and means for securing all of said plates to the rib members.

14. A sectional boat having a hull composed of a plurality of sections including bow sections, each of which is of greater average beam than the adjacent section forward; a plurality of stern sections each of which is of less average beam than the adjacent section forward, the bow and stern sections being so shaped that they make hull portions of fair form, and determinations of certain sections being of such cross section that a midship portion of the hull may be removed and the remaining bow and stern sections connected to form a complete hull; joining means for detachably connecting the after end of the last bow section to the forward end of the first stern section, said joining means including an amidship section shaped to merge the fair form of the last bow section with the fair form of the first stern section; means for securing the bow sections together; and means for securing the stern sections together.

15. A sectional boat having a hull composed of a plurality of sections including bow sections, each of which is of greater average beam than the adjacent section forward and each of which is curved so that when said sections are placed together in a predetermined order they will form a forward hull portion of fair form; a plurality of after sections each of which is of greater average cross-sectional area than the adjacent section aft, the bow and stern sections being so formed that a midship section of the hull may be removed and the remaining bow and stern sections connected to form a complete hull; joining means for connecting the after end of the last bow section to the forward end of the first stern section, said joining means including an amidship section which is shorter than the amidship section for which the fair form of the hull is designed, and which is shaped to merge the fair form of the last bow section with the fair form of the first stern section; means for securing the bow sections together; and means for securing the stern sections together.

16. As an article of manufacture a boat hull of fair form made up of more than four sections joined at stations, the hull being formed with certain of the stations forward of substantially identical cross-section to certain of the stations aft, and having a section detachably connected to hull sections at stations of substantially identical cross-section for connecting said sections without breaking the fair form of the hull.

17. A sectional boat hull including a pointed bow section; a plurality of curved sections fastened together and to which the bow section is connected to form a forward portion of a hull; a plurality of stern sections fastened together to form an after portion of a hull; means securing said forward and after sections together to form a complete hull; said sections in each portion being formed with respect to the sections of the other portion so that certain midship sections may be omitted and the remaining sections joined to form a complete hull; and a detachable amidship portion between the forward portion and the after portion, said amidship portion being of shorter length than the amidship portion for which the curve of the sections is designed and being formed to merge the curve of the forward portion with the curve of the after portion.

18. A sectional boat having a hull composed of a plurality of sections including bow sections, each of which is of greater average beam than the adjacent section forward; a plurality of stern sections each of which is of less average beam than the adjacent section forward, the bow and stern sections being so formed that a midship portion of the hull may be removed and the remaining bow and stern sections joined to form a complete hull; a connecting section detachably secured to the after end of the last bow section and to the forward end of the first stern section, and so shaped that it joins the diverging form of the bow sections with the converging form of the stern sections by a curve of fair form; and means for securing each of the hull sections to its adjacent hull section.

19. A metal boat including thin metal plates which may be bent by hand to conform to a predetermined form of hull; other similar thin metal plates mounted over said first thin metal plates to provide additional strength and rigidity to the hull; and means for securing said metal plates together to form laminated plates and for securing laterally adjacent plates so as to form joints for adding further to the rigidity of the hull.

20. A boat hull including plates which are laminated on the parts of the hull which require substantial curvature of the plates, each of said laminations comprising a sheet of material thin enough to be bent by hand to the desired form, and fastening means securing laterally adjacent plates together to form a joint for increasing the strength and rigidity of the hull.

In testimony whereof I affix my signature.

CHARLES W. NEILL.